United States Patent Office 3,698,908
Patented Oct. 17, 1972

3,698,908
PHOTOGRAPHIC MATERIALS COMPRISING FORMAZAN DYES
Eric Macdonald, Llanbrynmair, Wales, and Frederick Campbell, Failsworth, England, assignors to Ilford Limited, Ilford, Essex, England
No Drawing. Filed Feb. 19, 1971, Ser. No. 117,123
Claims priority, application Great Britain, Feb. 19, 1970, 8,095/70
Int. Cl. G03c 1/84
U.S. Cl. 96—84 R    2 Claims

ABSTRACT OF THE DISCLOSURE

The application describes a formazan dye of the formula:

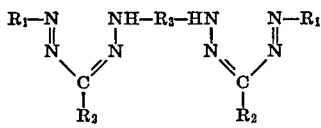

wherein $R_1$ is an aryl or substituted aryl group, $R_2$ is an alkyl group containing up to 6 carbon atoms and $R_3$ is either a diphenyl or a stilbene linkage group wherein, in either group, each of the benzene nuclei is substituted with a sulphonic acid group or an alkali metal or ammonium salt thereof.

---

This invention relates to new formazan dyes and to their production and their use in photographic silver halide mateiral.

According to the present invention there is provided a formazan dye of the general Formula I:

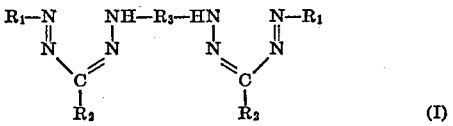

wherein $R_1$ is an aryl or substituted aryl group, $R_2$ is an alkyl group containing up to 6 carbon atoms and $R_3$ is either a diphenyl or a stilbene linkage group wherein, in either group, each of the benzene nuclei is substituted with a sulphonic acid group or an alkali metal or ammonium salt thereof. It is to be understood that the formazan moieties can exist in tautomeric modifications.

Compounds of Formula I wherein $R_3$ is a diphenyl linkage are prepared by forming the disulphonic acid derivative of benzidine, diazotising this compound to form the tetrazo derivative of the benzidine and reacting the tetrazo derivative with an aldehyde aryl-hydrazone compound of the general Formula II:

$$R_1\text{—NHN}{=}\text{CHR}_2 \qquad (II)$$

wherein $R_1$ and $R_2$ have the meanings assigned to them above, in the presence of a basic condensing agent and isolating the compound as the di-alkali metal salt.

Compounds of Formula I wherein $R_3$ is a stilbene linkage are prepared similarly except that the disulphonic acid derivative of diaminostilbene is formed and this compound is then tetrazotised.

The compounds of the present invention are of use as yellow filter dyes in photographic silver halide material.

In particular they are of use in the yellow filter layer in colour photographic material, which layer is present below the topmost emulsion layer to prevent blue light reaching the underlying green and red sensitive emulsion layers which are also blue sensitive.

In British patent specification No. 884,494 there is described the use of formazan dyes in photographic material. An example is given of a soluble formazan, Example 2, while the remaining examples are of insoluble formazans. The dye of Example 2 is not substantive to gelatin and diffuses from the layer in which it was coated into other layers of the photographic material during the coating process which is undesirable. The insoluble dyes described in specification No. 884,494 are substantive to gelatin and do not diffuse from the layer in which they are coated in the photographic material. They are not removable from the photographic material by washing but, as described in specification No. 884,494, their colour is rapidly and completely discharged in an alkaline potassium ferricyanide bath which may be used in the first step of the removal of silver from colour processed material. However combined bleach-fix baths which are less alkaline are increasingly being used instead of alkaline potassium ferricyanide baths and such bleach-fix baths do not discharge the colour of formazan dyes. However the formazan dyes of the present invention may be used in colour photographic material which is to be processed by use of a combined bleach-fix bath because while they are sufficiently substantive to the gelatin layer in which they are coated, especially if the gelatin layer has a pH below 7, they are sufficiently water soluble to enable them to be readily removed from the photographic material during the processing of the material.

Further the dyes of the present invention exhibit a good spectral absorption and a high extinction coefficient.

Therefore, according to another aspect of the present invention there is provided colour silver halide photographic material which comprises a gelatin yellow filter layer which contains as the yellow dye thereof at least one of the formazan dyes of the Formula I.

Preferably the said gelatin layer has a pH lower than 7. In the examples the parts stated are by weight.

The following examples will serve to illustrate the invention.

EXAMPLE I

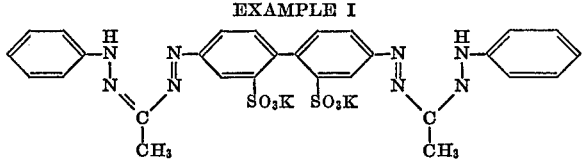

This compound was made by the azo coupling of tetrazotised benzidine-2-:2'-disulphonic acid with acetaldehyde phenylhydrozone in pyridine solution and isolated as the di-potassium salt.

Tetrazotisation 86 parts of a 47% w./w. paste of benzidine-2:2'-disulphonic acid were dissolved in 600 parts of warm water containing 50 parts of sodium hydroxide 70° Tw. liquor. After filtration, the faintly alkaline solution was treated with a solution of 20 parts of sodium nitrate in 300 parts of water and added over 30 minutes with stirring to a mixture of 160 parts of concentrated hydrochloric acid 36° Tw. and 1000 parts of ice. 100 parts of sodium chloride were added and the tetrazo compound which separated out was collected by filtration.

Coupling 32 parts of freshly prepared acetaldehyde phenylhydrazone dissolved in 150 parts of pyridine were cooled in an ice bath and the tetrazo compound obtained above was added very quickly with stirring the temperature being below 10° C. The reaction mixture was then stirred at room temperature for 12 hours and the pyridine salt of the dye which separated was filtered off. It was slurried in 300 parts of water and treated with 17.5 parts of potassium carbonate (anhydrous) followed by 60 parts of potassium acetate. The di-potassium salt of the dye was collected by filtration and excess potassium acetate removed by washing with 200 parts of ethanol. 40 parts of the product were obtained as an orange coloured powder.

In dilute alkaline solution the absorption max was 432 mμ.

A gelatin coating containing the dye as just prepared was prepared by adding a 1% aqueous solution of the dye to an equal weight of 5% gelatin solution containing a little wetting agent. The pH was adjusted to just below 7 and the mixture coated on a film base. On drying the λ$_{max.}$ was found to be 437 mμ. When a gelatin supercoat was applied cross sectional examination showed the absence of any diffusion of the dye in this layer. The dye was completely removed when the material was processed.

EXAMPLE II

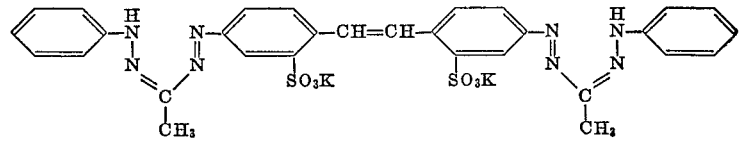

Tetrazotization 4.4' diamino stilbene 2.2' disulphonic acid (6.9 parts) was dissolved with warming in a solution of 2 N sodium nitrate solution (100 parts), sodium hydroxide liquor (0.4 part) and water (50 parts). The solution was screened and cooled to 0° C., with stirring. Concentrated hydrochloric acid (10 parts) was added to the solution, maintaining the temperature below 50° C. by the use of external cooling. The suspension of the tetrazotized material was stirred, below 5° C., for two hours. The precipitated solid was filtered off and washed well with cold water until free of nitrous acid by the starch-iodide test and acid free to congo red paper.

Coupling

The filtercake was suspended in water and added, with stirring, to a solution of acetaldehyde phenyl hydrazone (2.7 parts) dissolved in pyridine (49 parts). The temperature was maintained below 0° C. during the addition. The solution was stirred for a futher 1 hour below 0° C. and then allowed to stand at this temperature for 18 hours.

The product was isolated by adding the above solution, dropwise, to concentrated hydrochloric acid (60 parts) stirred at 0° C. and maintaining the temperature below 0° C. by the addition of ice. The purple brown precipitate was filtered off and washed with water until pyridine free. The product was slurried in water and dissolved by the addition of potassium carbonate. The resultant solution was warmed to 40° C. and screened. The filtrates were cooled to 20° C. and the product precipitated by the addition of 60% w./v. potassium acetate solution. The product was filtered off and dried. 4.44 parts of the product was obtained as a powder.

In dilute alkaline solution the absorption maximum was 470 nm.

We claim as our invention:
1. Photographic silver halide material which comprises in a layer thereof at least one formazan dye of the formula:

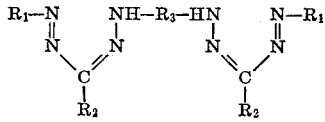

wherein $R_1$ is an aryl group, $R_2$ is an alkyl group containing up to 6 carbon atoms and $R_3$ is either a diphenyl or a stilbene linkage group wherein, in either group, each of the benzene nuclei is substituted with a sulphonic acid group or an alkali metal or ammonium salt thereof.

2. Photographic silver halide colour material which comprises a gelatinous yellow filter layer which contains as the yellow dye thereof at least one formazan dye of the formula:

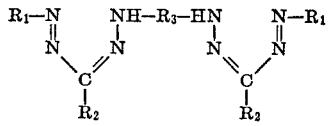

wherein $R_1$ is an aryl group, $R_2$ is an alkyl group containing up to 6 carbon atoms and $R_3$ is either a diphenyl or a stilbene linkage group wherein, in either group, each of the benzene nuclei is substituted with a sulphonic acid group or an alkali metal or ammonium salt thereof.

References Cited
UNITED STATES PATENTS 3,050,393　8/1962　Macdonald et al. ____ 96—84 R
3,227,556　1/1966　Oliver et al. _____ 96—84 R RONALD H. SMITH, Primary Examiner U.S. Cl. X.R.
260—176; 96—72